United States Patent
Vaganov

(10) Patent No.: US 6,715,936 B2
(45) Date of Patent: Apr. 6, 2004

(54) PHOTONIC COMPONENT PACKAGE AND METHOD OF PACKAGING

(75) Inventor: Vladimin Vaganov, Los Gatos, CA (US)

(73) Assignee: MegaSense, Inc., Sunnyvale, CA (US)

( * ) Notice: Subject to any disclaimer, the term of this patent is extended or adjusted under 35 U.S.C. 154(b) by 30 days.

(21) Appl. No.: 10/056,265

(22) Filed: Jan. 22, 2002

(65) Prior Publication Data

US 2003/0138220 A1 Jul. 24, 2003

(51) Int. Cl.[7] .................................................. G02B 6/36
(52) U.S. Cl. ............................ 385/92; 385/88; 385/93; 385/94
(58) Field of Search ........................... 385/88, 89, 90, 385/91, 92, 93, 98, 14, 49

(56) References Cited

U.S. PATENT DOCUMENTS

| | | | | |
|---|---|---|---|---|
| 4,399,453 A | * | 8/1983 | Berg et al. ............... | 385/88 |
| 4,439,006 A | * | 3/1984 | Stevenson .............. | 385/88 |
| 4,639,077 A | * | 1/1987 | Dobler ................... | 385/92 |
| 4,650,285 A | * | 3/1987 | Stevenson .............. | 385/53 |
| 4,656,847 A | * | 4/1987 | Bean et al. .............. | 68/23.2 |
| 4,726,648 A | * | 2/1988 | Haberland et al. ....... | 385/92 |
| 4,954,853 A | * | 9/1990 | Yoshida et al. .......... | 257/82 |
| 4,961,616 A | * | 10/1990 | Tada ...................... | 385/88 |
| 5,011,247 A | * | 4/1991 | Boudreau et al. ........ | 385/33 |
| 5,032,898 A | * | 7/1991 | Bowen et al. ............ | 257/433 |
| 5,227,646 A | * | 7/1993 | Shigeno .................. | 257/80 |
| 5,353,294 A | * | 10/1994 | Shigeno .................. | 385/90 |
| 5,522,001 A | * | 5/1996 | Meadowcroft ........... | 385/80 |
| 5,590,232 A | * | 12/1996 | Wentworth et al. ...... | 385/92 |
| 5,737,467 A | * | 4/1998 | Kato et al. ............... | 385/92 |
| 5,745,624 A | * | 4/1998 | Chan et al. ............... | 385/91 |
| 5,881,193 A | * | 3/1999 | Anigbo et al. ........... | 385/93 |
| 6,513,991 B1 | * | 2/2003 | Kowalski ................ | 385/92 |
| 2003/0049009 A1 | * | 3/2003 | Vaganov et al. ......... | 385/140 |

* cited by examiner

*Primary Examiner*—Michael P. Stafira
*Assistant Examiner*—Juan D Valentin, II

(57) ABSTRACT

A method of packaging a photonic component and a photonic component package are provided. The package comprises a package body a set of pins, wherein the orientation of the pins does not increase the footprint requirements of the package when the package is mounted onto a module. A semiconductor die is attached to and enclosed within the package. The die may be a MEMS and may include a movable mirror. An optical fiber is attached in a parallel orientation to a mounting surface of the module. The package is a low cost part with pins attached on a pinout side. An optional photonic inlet of the package is additionally coupled with one or more external photonic elements. The photonic inlet is positioned relative to a through hole to allow light to travel between the MEMS die and the external photonic element. The photonic inlet and one or more external photonic elements may be partially enclosed by a boot that provides increased mechanical stability when the package is coupled with a printed circuit board.

31 Claims, 14 Drawing Sheets

PHOTONIC COMPONENT PACKAGE AND METHOD OF PACKAGING

FIELD OF THE INVENTION

The present invention relates to photonic component packages, and more particularly to methods of fabricating photonic component packages with reduced footprint requirements.

BACKGROUND OF THE INVENTION

Photonic components are of increased benefit when reduced in size and cost. The cross-sectional area of a surface of an electronic module, subsystem, or system that is taken up by, or devoted to, a certain photonic component is referred to as the footprint of that component. The footprint required to couple or interface a photonic component with a printed circuit board or an electronic circuit, module, system, subsystem or socket is typically related to the design of the package of the component that encloses the photonic and electronic elements of the device. In particular, the need to couple or attach photonic elements, such as optical fibers, to photonic components creates needs in the art for improvement in the design of photonic component packages.

Kato, et al., in "Optical module, method for manufacturing optical module and optical communication apparatus", U.S. Pat. No. 6,282,352 (Aug. 28, 2001) disclose a method to form an optical module with a plastic package by molding resin around an optical device and an optical fiber. Kato et al. provide a package having high rigidity and low thermal expansion properties. But the disclosure of Kato et al. fails to consider or provide optional orientations for insertion of the package into a larger system. Kato et al. does not address the advantages of installing the package onto a printed circuit board after high temperature manufacturing steps of the printed circuit board are completed.

Iida et al. disclose, in U.S. Pat. No. 6,186,673, "Package for optical semiconductor module," Feb. 13, 2001, an improvement in mounting an optical semiconductor module onto a printed circuit board. The improvement of Iida et al. enables a system designer to orient the optical module in a range of orientation angles relative to a high frequency circuit board. Iida et al. does not enable the low cost application of conventional and low cost package manufacturing methods and suitable materials known in the art, such as ceramic or plastic.

Hoang-Phong La discloses, in International Patent Application (PCT) No. WO 00/60673 (Publication Date: Oct. 12, 2000) entitled "An electro-optical package for reducing parasitic effects", a package design that allows photonic and electrical signals to be received processed, and responded to with an electrical or a photonic resultant signal. La teaches that his invention can be embodied in a standard and low cost package type and style. Yet La's work is limited to the provision of a device that accepts and emits electrical and photonic signals via a plurality of electricity-to-light and light-to-electricity converters and wherein all of the converters are aligned along the same side of a substrate. La fails to provide or consider a generally applicable package or packaging technique that enables a coupling of a photonic element, e.g., an optical fiber, or a collimator, with a MEMS or semiconductor device and within or via a low cost and standard package size and type.

There is, therefore, a long felt need to provide a photonic component packages with reduced footprint requirements and that allow for employing low cost manufacturing techniques and may be attached to a socket, a printed circuit board or other appropriate system or module known in the art.

OBJECTS OF THE INVENTION

It is an object of the present invention to provide a package for a photonic component.

It is an object of certain preferred embodiments of the present invention to provide a photonic component package having a reduced footprint requirement for mounting onto a module and coupling to one or more optical fibers, wherein a length of at least one the optical fiber proximate to the photonics component package is substantially parallel to a mounting surface of the module.

It is another object of certain preferred embodiments of the present invention to provide a packaging method for fabricating photonic components.

It is yet another object of certain preferred embodiments of the present invention to provide a package that partially or entirely encloses a semiconductor die, such as a photonic element or a micro-electromechanical system die.

It is an object of yet other certain alternate preferred embodiments of the present invention to provide a photonic component that comprises a low cost package, the package substantially complying with a suitable semiconductor industry package standard known in the art.

It is an object of certain still other preferred embodiments of the present invention to provide a photonic component with die attachment performed by certain suitable semiconductor industry standard die attach equipment.

It is an object of certain yet other alternate preferred embodiments of the present invention to provide a method of packaging a photonic component having wire bonds formed by certain suitable semiconductor industry standard wire bonding equipment.

It is an object of certain even other alternate preferred embodiments of the present invention to provide a method of packaging photonic components by certain suitable semiconductor industry standard packaging equipment.

It is an object of certain yet other alternate preferred embodiments of the present invention to provide a method of lid attachment of photonic component packages by certain suitable semiconductor industry lid attach equipment.

It is an object of certain other alternate preferred embodiments of the present invention to provide a method of marking of photonic component packages by certain suitable semiconductor industry marking equipment.

It is an object of certain still other alternate preferred embodiments of the present invention to provide photonic components at least partially testable by certain suitable semiconductor industry standard test equipment.

It is an object of certain yet other alternate preferred embodiments of the present invention to provide photonic components mounted onto printed circuit boards by certain suitable semiconductor industry standard mounting equipment.

It is an object of certain other alternate preferred embodiments of the present invention to provide a boot that at least partially encloses a photonic element coupled with a photonic component package, and wherein the boot and the photonic component package have increased mechanical stability when the photonic component package is attached to a module.

SUMMARY OF THE INVENTION

It is an object of the present invention to provide a package for a photonic component that (1) presents a reduced footprint requirement, (2) that enables an optical coupling of a photonic element and a semiconductor die, and (3) supports electrical communications between the semiconductor die module, the module comprising a printed circuit board, an electronic circuit, subsystem or system. A footprint of the package is defined as the cross-sectional area of the module, or of a mounting surface of the module, that is required to be available for use in mounting the present invention to the module.

The preferred embodiment, or invented package, is a low cost package that includes a package body having an interior with a cavity, a photonic element side. A plurality of pins of the invented package extend from the package body. The pins are oriented to not increase the footprint requirement of the present invention beyond that required by the present invention with the pins removed. The projections of the pins reside wholly within the footprint of the package body and the pins do not expand the footprint of the invented package beyond a footprint of the package body. Each pin comprises a substantially straight section.

An external photonic element, such as an optical fiber, is coupled to the invented package and is positioned to establish a parallel orientation with the mounting surface of the module when the pins are inserted into the module. Each pin comprises a substantially straight section.

The term module as defined in reference to the present invention include passive and/or active mechanical, optical, photonic, or electronic hardware and circuitry, including or comprising, but not limited to, an electronic equipment, a printed circuit ("PC") board, a socket, an electronic circuit, a photonic circuit, an electronic system subsystem, and a photonic system or subsystem.

The photonic component may be a variable optical attenuator ("VOA"), an optical switch, an optical filter, a multiplexer, a demultiplexer, an add-drop optical signal filter, or other suitable optical or photonic devices or circuits known in the art. It is another object of the present invention to provide a method of packaging photonic components.

A through hole permits access by light from the photonic element side of the package to and/or from the die photonic element along an optical axis of and extending from a length of the photonic element proximate to the through hole. The through hole passes entirely through the lid or the package body and to the cavity. A die is attached within the cavity. The die includes a diced or separated portion of an initial semiconductor wafer. The initial semiconductor wafer is formed with two wafer planar sides. The semiconductor die is then cut, diced, or otherwise separated from the initial wafer. The thickness of the die is smaller than either the width or breadth of the die's portions of each wafer planar side. Electrical contact pads are located on the one planar side of the die and a die photonic element, such as a movable mirror, photodiode, or laser, is coupled to the same planar side or the other planar side of the die. A package lid substantially covers the cavity, whereby the die is essentially enclosed within the package. Three pins are attached to and extend generally perpendicularly from a pinout side of the package. The pins may be attached on the pinout side along a line. The projections of the pins onto the pinout side reside wholly within a footprint of the package body. The pins do not expand the footprint of the invented package beyond the footprint of the package body. The pins are electrically coupled with the die via wire bonds between the package body and the electrical contact pads of the die. Electrical power, control and communications signals pass to and from the module, such as a PC board, and to the die via the pins.

The position and/or state of the die photonic element is controlled or affected by the control signals sent to the die via the pins. The die is positioned within the photonic component package approximately parallel to the pins, wherein at least one of the planar sides of the die is approximately parallel to at least one of the pins.

In the invented package a photonic inlet is mechanically attached to the photonic element side, or element side, of the package. The element side and the pinout side lie in substantially orthogonal planes, whereby the element side is located approximately at a right angle to the element side. A collimator may be attached to the photonic inlet, and at least one optical fiber and/or one photonic element may be attached to the collimator. The optical fiber and/or the photonic element are positioned relative to the die photonic element to interact or couple with the optical fiber and the photonic element.

The term parallel when applied herein to an orientation between the photonic inlet and a mounting surface of a module denotes an orientation between the mounting surface and the photonic inlet that supports or imposes a parallel orientation between an optical axis of a photonic element and the mounting surface when the photonic element is coupled with the photonic inlet.

A second preferred embodiment, or an invented VOA package, provides a package that optically couples a photonic MEMS die and at least two optical fibers. The photonic MEMS die is enclosed within the package body and lid, and the at least two optical fibers are coupled with the photonic inlet via a dual fiber or multi-fiber collimator, as appropriate. The lid and package body of the invented VOA package encloses the MEMS die. The MEMS die is attached to the package using suitable standard die attach equipment and techniques known in the art. The MEMS die is wire bonded to wire bond pads located in the package. The wire bonding is accomplished with standard wire bonding equipment and applying a suitable wire bonding technique known in the art. The wire bond pads are electrically connected with the pins via traces.

The invented VOA package is designed and sized in conformance with one or more standard semiconductor industry materials, sizing and design standards such that the invented VOA package may be formed, fabricated, assembled, wire bonded, packaged, marked, tested and attached to the PC board with suitable semiconductor industry standard materials, equipment and/or methods. The lid is attached to the package body with standard semiconductor industry lid attach equipment. The invented VOA package is marked with standard semiconductor industry marking equipment. Various preferred embodiments of the package may comprise suitable plastic, metallo-ceramic, or metal-glass, or other suitable materials, known in the art. The photonic inlet is approximately or substantially parallel to a mounting surface of the mounting module, whereby an optical axis of each of the optical fibers is, at a point of photonic coupling between the optical fibers and the semiconductor die, approximately or substantially parallel to the mounting surface of the module.

A third preferred embodiment of the present invention further comprises a boot, wherein the boot protects and at least partially encloses an external photonic element and a photonic inlet, and enables the photonic coupling of the external photonic element and the semiconductor die. The boot includes a boot opening, a boot hole, a planar base and an upper wall. The upper wall and the planar base at least partially enclose the photonic inlet. The upper wall may be or comprise a curved surface, or a partially cylindrical surface, or one or more flat surfaces. The boot opening enables the at least partial insertion of the external element into the boot. The base provides a planar surface, wherein the planar surface is placed in mechanical contact with a module when the third preferred embodiment of the present invention is electrically coupled with the module. The boot thereby provides increased mechanical stability of the package when the package is mounted onto the module.

The upper wall, or upper, of the boot of the third preferred embodiment includes a planar top surface that is parallel with the base, and two planar side surfaces that are perpendicular to the base. The base is positioned against and parallel to a mounting surface of the module. The term parallel when applied herein to an orientation between a boot of the present invention and a mounting surface of a module denotes an orientation between the mounting surface and the boot that supports or imposes a parallel orientation between a base of the boot and the mounting surface.

The substantially flat and planar surfaces of the base, the top surface, and the two side surfaces provide surface areas that are easier and less expensive to mark and add signage to than curved or non-flat surfaces. Automated mounting and handling systems more efficiently grasp and position the boot due to the flatness of the base, the top surface, and the two side surfaces, in contrast to prior art housings or boots that are curved or non-planar. The flatness and orientation of the base, top surface, and both side surfaces enable more efficient packing and shipping of the boot of the third preferred embodiment over the prior art.

Certain alternate preferred embodiments of the method of the present invention can optionally enable the assembly of a photonic component that may be assembled with suitable clean room compatible testing and fabrication equipment known in the art. The range of meaning of the term fabrication includes herein suitable processes and process steps known in the art of assembling, wire bonding, trimming, sealing, die attaching, molding, forming, mounting, packaging, marking, and manufacturing photonic components and modules, such as electrical systems, sockets, subsystems, and circuits. The invented VOA package may be mounted onto a module, such as an electrical circuit, a PC board, a system, a subsystem, or a socket, and by using suitable standard device or component mounting equipment and techniques known in the art.

In certain still alternate preferred embodiments of the present invention the photonic element attached to the package is optically coupled and optionally mechanically attached to the package, wherein the photonic element is selected from the group consisting of a wave guide, a planar wave guide, a photonic crystal wave guide, a diffraction wave guide grating, an optical fiber, a collimator, a dual fiber collimator, a multi-fiber collimator, a lens, a diffractive lens, an optical lens, a spherical lens, an aspherical lens, a ball lens, a GRIN lens, a C-lens, a lens system, a mirror, a MEMS-based movable micro-mirror, a flat mirror, a shaped mirror, a diffractive mirror, a grating plate or plates, a laser, a modulator, a photodiode, a VCSEL, and a prism.

Certain alternate preferred embodiments of the present invention include varieties of numbers of pins, from one to twelve, to larger pin counts. The pins may be attached in various linear and non-linear patterns to one or more sides of the package body. The pins may be arranged and shaped to meet an industry packaging standard and optionally to fit into a standard or non-standard socket.

The above summary of the present invention is not intended to describe each illustrated embodiment or every implementation of the present invention. The figures and the detailed description which follow more particularly exemplify these embodiments. Other objects, features, and advantages of the present invention will be apparent from the accompanying drawings and from the detailed description which follows below. The invention will now be elucidated in more detail with reference to certain non-limitative examples of embodiment shown in the attached drawing figures.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF A PREFERRED EMBODIMENT

While the description above provides a full and complete disclosure of the preferred embodiments of the present invention, various modifications, alternate constructions, and equivalents will be obvious to those with skill in the art. Thus the scope of the present invention is limited solely by the appended claims.

Figure 1:
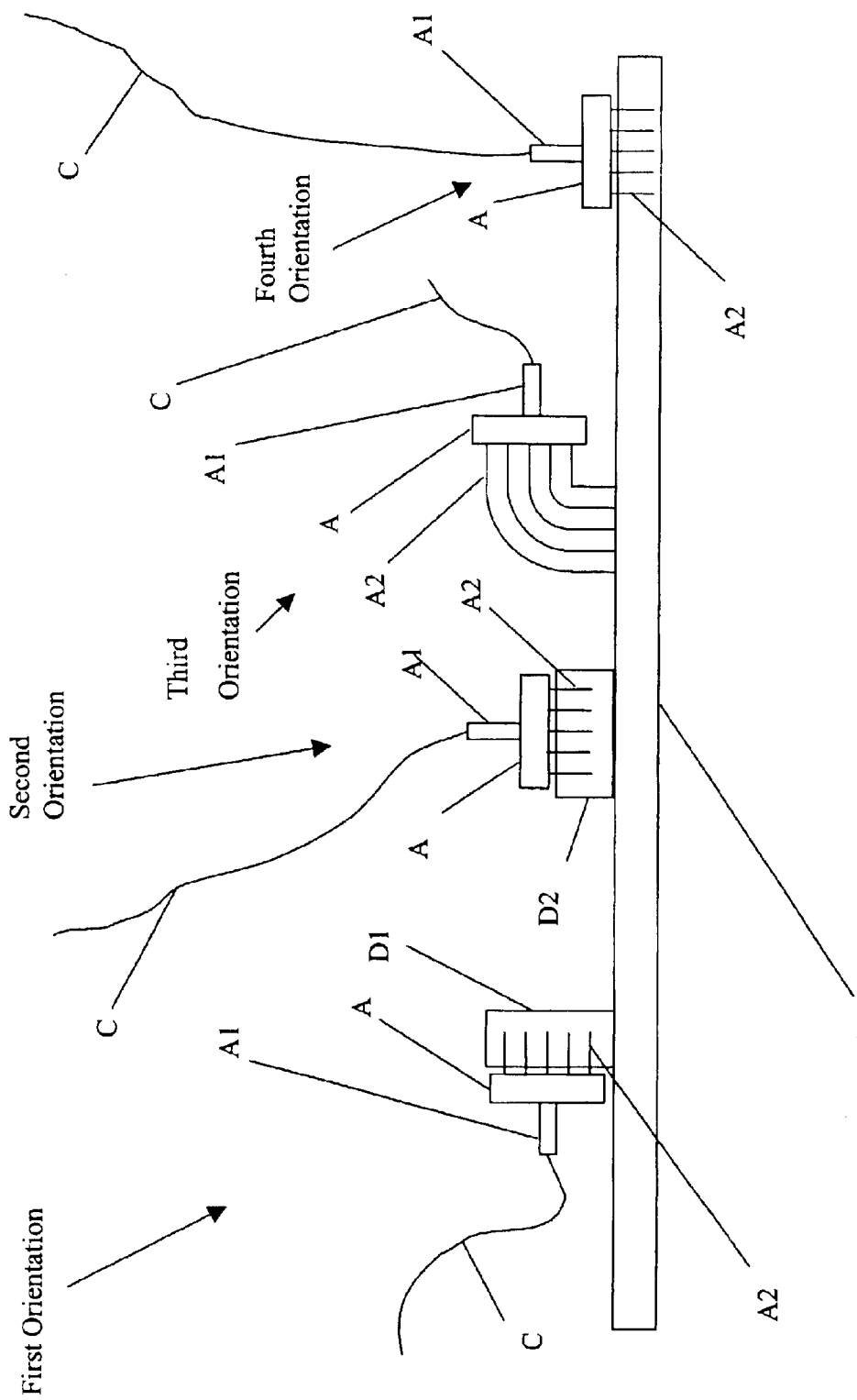
FIG. 1 is a cross-sectional view of four orientations of a prior art photonic component coupled with a PC board.

Referring now generally to the Figures and particularly to FIG. 1, FIG. 1 is a cross-sectional view of four orientations of a prior art photonic component A coupled with a PC board B. A collimator A1 of the prior art device A is coupled with an optical fiber C. In a first orientation a plurality of pins A2 are inserted into a socket D1, whereby the pins A2 are place in parallel with the PC Board B. In a second orientation the plurality of pins A2 are inserted downwards and towards the PC Board and into a socket D2. In a third configuration the plurality of pins A2 are extended in length and bent downwards towards a direct mechanical coupling with the PC board B. In a fourth orientation the pins A2 are inserted directly into the PC board B. The four prior art orientations of FIG. 1 illustrate the footprint requirements of the prior art.

Figure 2:
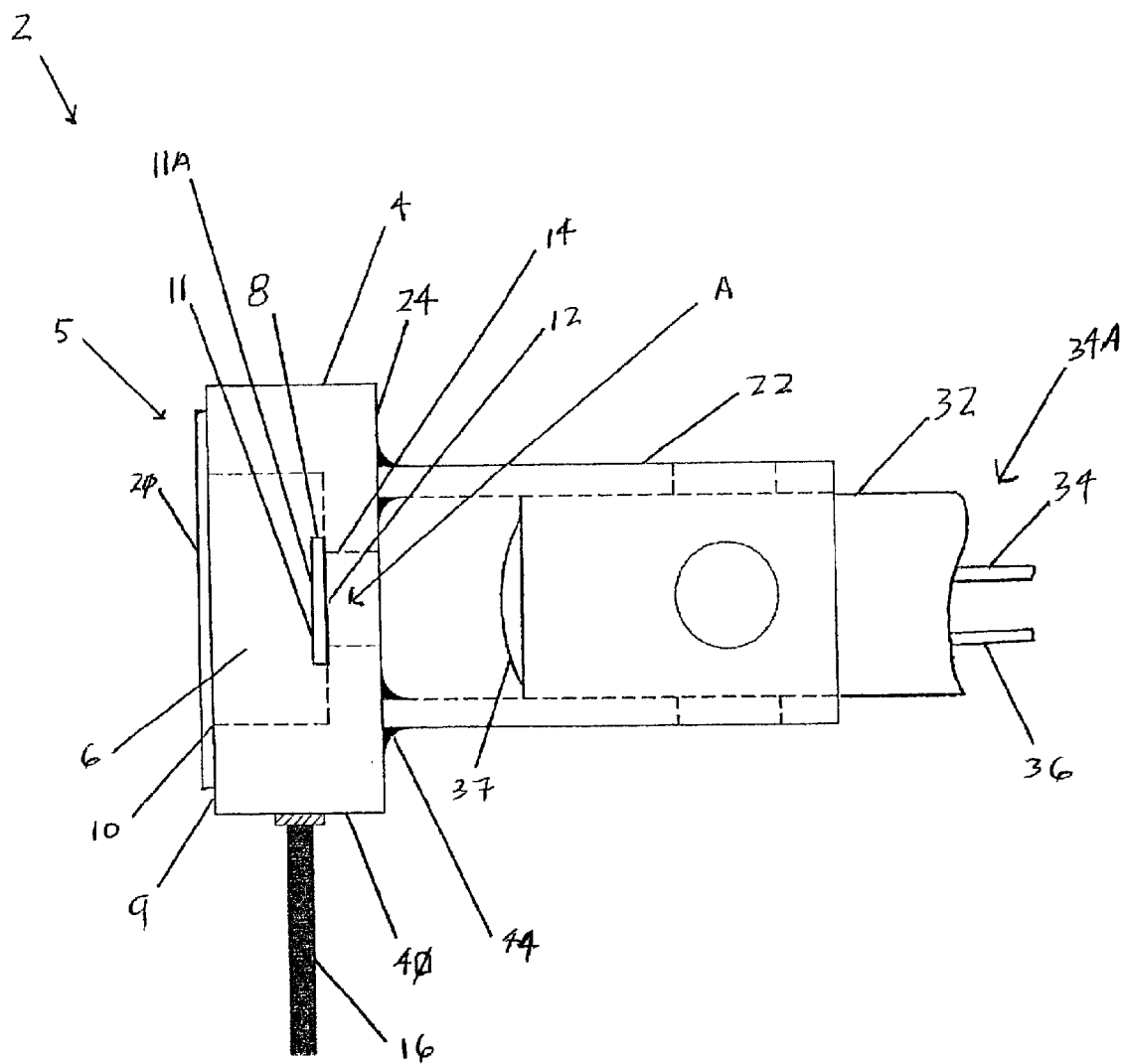
FIG. 2 is a cross-sectional view of a first preferred embodiment of the present invention, or invented package.

Referring now generally to the Figures and particularly to FIG. 2, FIG. 2 is a cross-sectional view of a first preferred embodiment of the present invention, or invented package 2. The invented package 2 is a low cost package comprising a package body 4 having an interior 5 with a cavity 6. A MEMS die 8 is substantially located within the cavity 6 and is attached to the package body 4. The package body 4 may be or comprise a plastic, a ceramic or another suitable material known in the art. More particularly the package body 4 may comprise ALUMINA ceramic. The package body 4 includes a cavity side 9 with a cavity aperture 10. The MEMS die 8 has a semiconductor substrate plate 11, or plate 11. The plate 11, that has a first planar side 11A and a second opposite planar side 11B. The first planar side 11A and the second opposite planar side 11B are substantially planar and parallel. The MEMS die 8 further comprises, or is coupled with, a movable mirror 12. The movable mirror 12, or mirror 12, is positioned in line with a through hole 14. The orientation of the mirror 12 and the through hole 14 allows both the passage of light into the package and onto the mirror 12, and reflection of light at variable angles from the mirror 12 and through the through hole 14. The movable mirror 12 is positioned in line with a through hole 14 to receive all or at least a part of the light passing through the through hole 14 directed toward an area A of the second opposite planar side 11B, or topside 11B. It is understood that the area A is, in various alternate preferred embodiments of the present invention a subset of a surface area of the second opposite planar side 11B or the entire surface area of the MEMS die 8 that is oriented toward the through hole 14. The mirror 12 is movable and moves in response to power and/or control signals conducted through a plurality of pins 16 and to the MEMS die 8. The moving or tilting of the mirror 12 controls the angle at which light is reflected from the MEMS die 8. The plurality of pins 16 are mechanically attached to a pinout side 18 of the package body 4 and electrically coupled to the MEMS die 8. The plurality of pins 16 may be or comprise a metal or another suitable electrically conductive material known in the art. More particularly, the pins may comprise KYOCERA ALLOY 42 metal. The plurality pins 16 may be arranged and shaped to meet an industry packaging standard and optionally to fit into a standard or non-standard socket. A package lid 20 of the invented package 2 substantially covers the cavity aperture 10 and a photonic inlet 22 is attached to an element side 24 of the package body 4. The through hole 14 extends from the element side 24 and to a base wall 26 of a package cavity 28. The MEMS die 8 is attached to the base wall 26. A cavity side wall 30 extends from the base wall 26 and to the cavity aperture 10.

A collimator 32 is attached to the photonic inlet 22. An optical fiber 34 and an external photonic element 36 are attached to the photonic inlet 22. A lens 37 focuses and/or collimates light passing between the MEMS die 8 and the optical fiber 34 and/or the external photonic element 36, and substantially parallel to an optical axis X of a length 34A of the optical fiber 34. The external photonic element 36 may be or may comprise a photonic element selected from the group consisting of a wave guide, a planar wave guide, a photonic crystal wave guide, a diffraction wave guide grating, an optical fiber, a collimator, a dual fiber collimator, a multi-fiber collimator, a lens, a diffractive lens, an optical lens, a spherical lens, an aspherical lens, a ball lens, a GRIN lens, a C-lens, a lens system, a mirror, a MEMS-based movable micro-mirror, a flat mirror, a shaped mirror, a diffractive mirror, a grating plate or plates, a laser, a modulator, a photodiode, a VCSEL, and a prism. Light may be emitted to and from the optical fiber 34 and the external photonic element 36 in accordance with the photonic and optical properties of the optical fiber 34 and the selected external photonic element 36.

The photonic inlet 22 is located about the through hole 14 in an orientation that enables the transmission of light to and/or from the MEMS die 8 and either or both the optical fiber 34 and external photonic element 36. The photonic inlet 22 is made of KOVAR metal and has layers of metal on an outside surface 38. The layers of material are conducive to brazing the photonic inlet 22 onto the element side 24 of the package body 4. The photonic inlet 22 of the invented package 2 has a tungsten layer, covered by a Nickel layer, followed by a Gold layer. The Tungsten may be 50 to 150 micro inches. The intermediate layer of Nickel may be from 100 to 150 micro inches thick. And the Gold layer may be approximately 60 micro inches thick. The thickness and composition of each metal layer varies in certain alternate preferred embodiments. The photonic inlet 22 is brazed onto the element side 24 along a cylindrical photonic inlet end 40.

Figure 3:
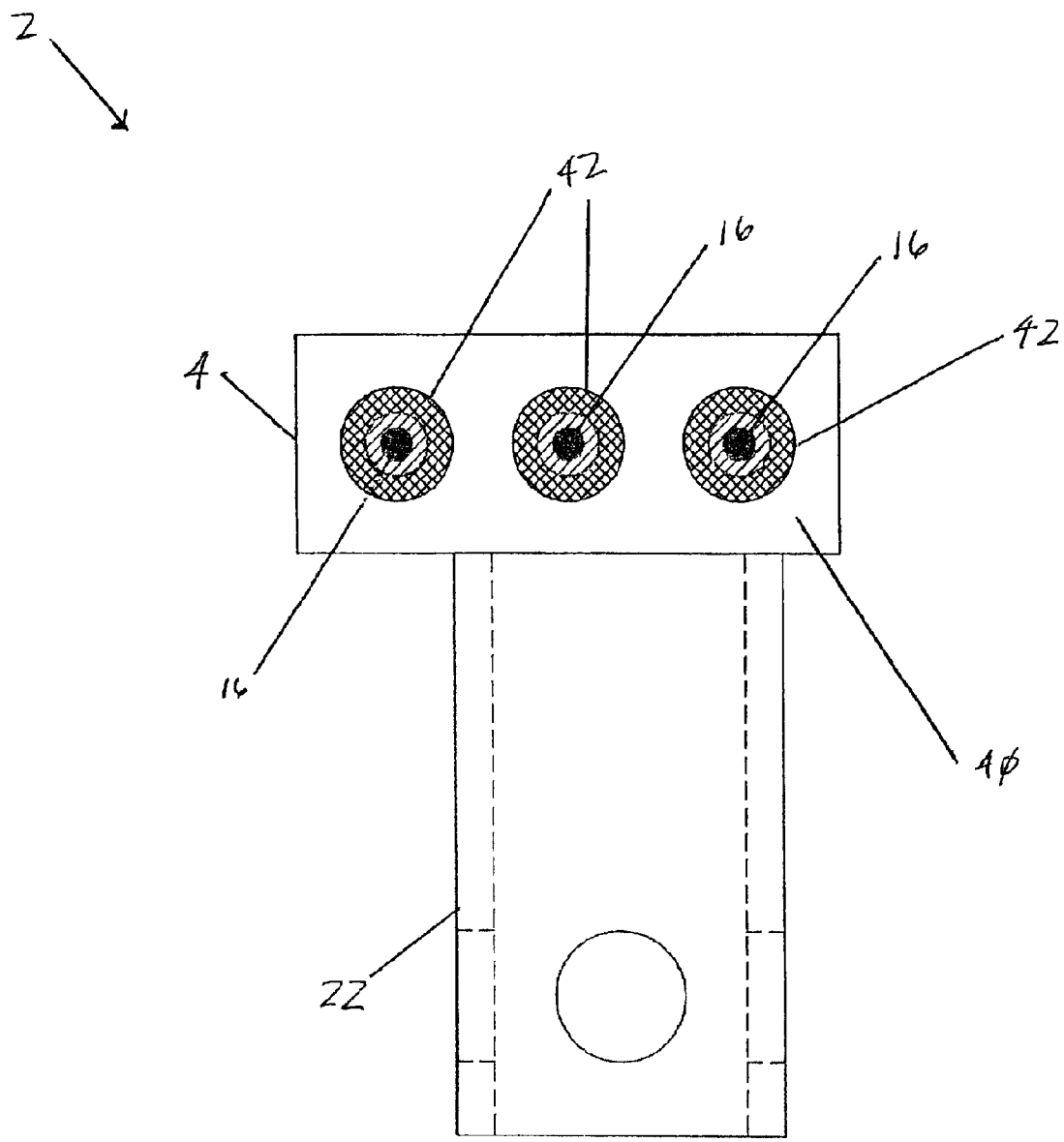
FIG. 3 is a cross-sectional view of the pinout side of the invented package of FIG. 2.

Referring now generally to the Figures and particularly to FIG. 3, FIG. 3 is a cross-sectional view of a pinout side 40 of the invented package 2 of FIG. 2. The pins 16 extend from the pinout side 40 of the package body 4. The pins 16 are attached to the pinout side 40 along a linearly spaced series of attachment points 42. The projections of the pins onto the pinout side reside wholly within a footprint of the package body 4 and the pins 16 do not expand the footprint of the invented package 2 beyond the footprint of the package body 4.

Figure 4:
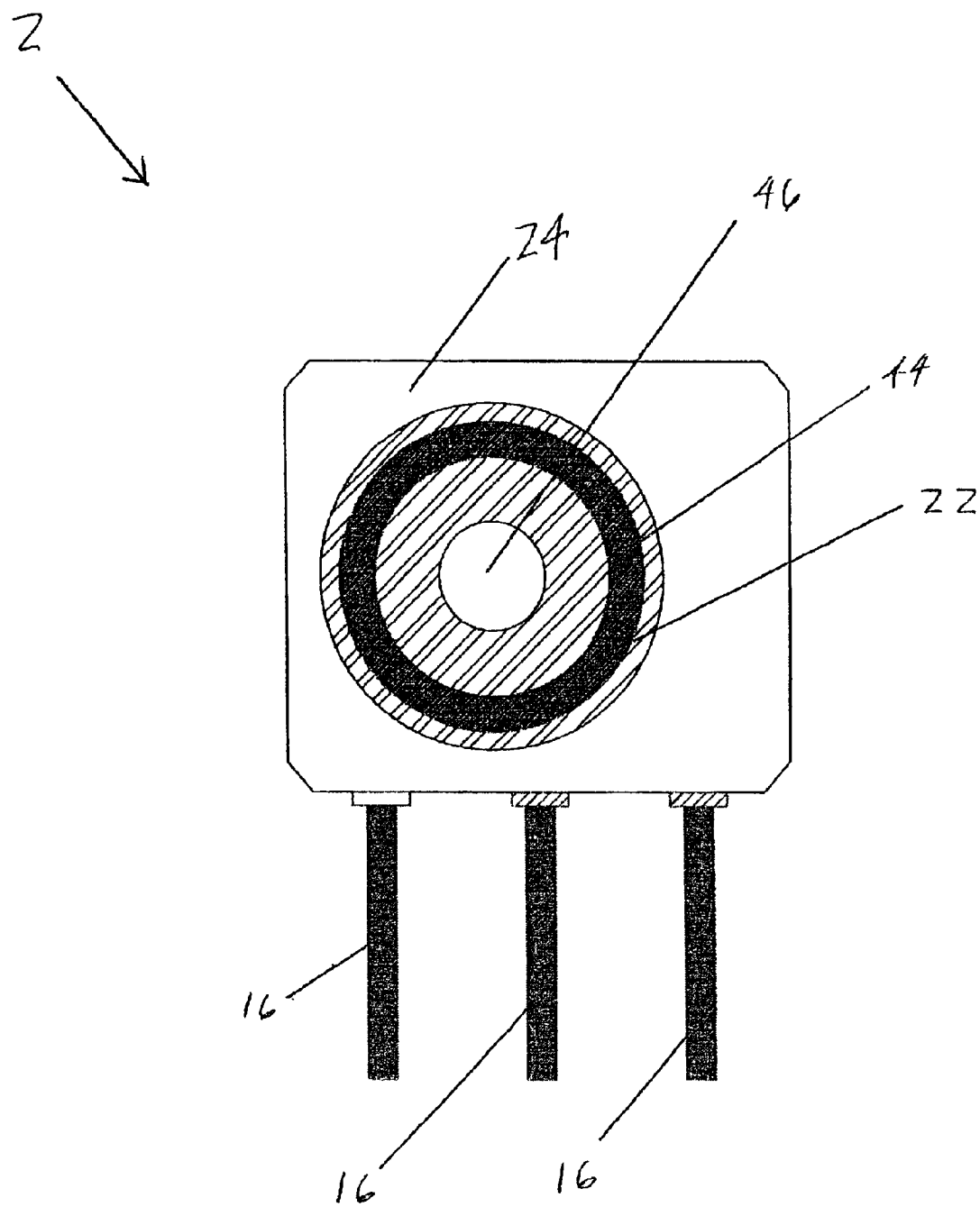
FIG. 4 is a cross-sectional view of the photonic element side of the invented package of FIG. 2.

Referring now generally to the Figures and particularly to FIG. 4, FIG. 4 is a cross-sectional view of the element side 24 of the invented package 2 of FIG. 2. The photonic inlet 22 is brazed onto the element side 24 along a circular photonic inlet end 44. The through hole 14 permits light to travel in and out of the package body 4 and to and from the mirror 12 of the MEMS die 8. The through hole 14 may have an optional transparent shield 46 that protects the MEMS die 8 and does not unacceptably diminish the intensity of light in transmission into or out of the package body 4.

Figure 5A:
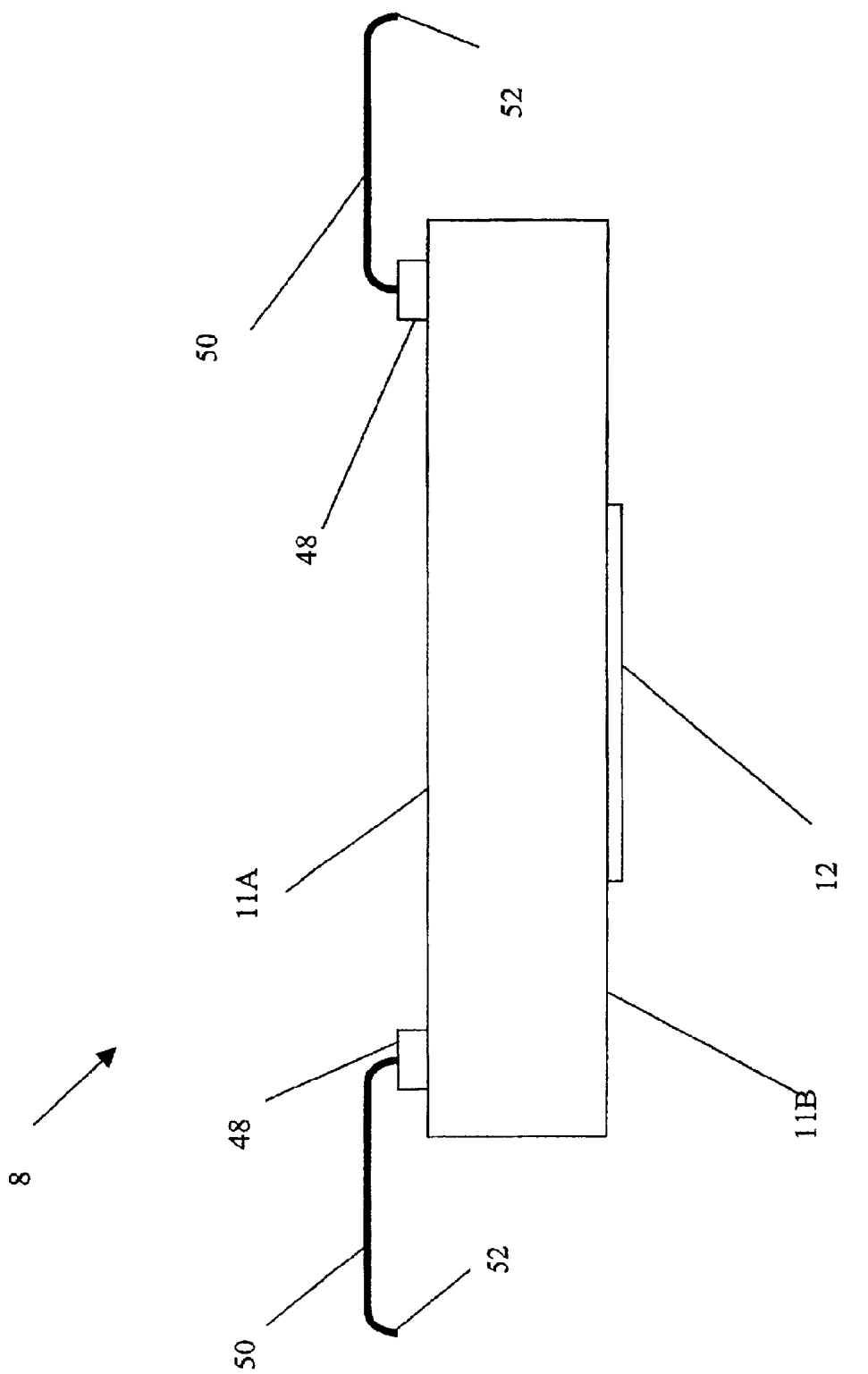
FIG. 5A is a side view of a MEMS semiconductor die of FIG. 2.

Referring now generally to the Figures and particularly to FIG. 5A, FIG. 5A is a cross-sectional view of the MEMS semiconductor die 8 of FIG. 2. The first planar side 11A of the MEMS die 8 has a plurality of electrical contact pads 48. Each of a plurality of wire bonds 50 are electrically coupled with at least one of the contact pads 48 and with at least one of the pins 16, as shown in of FIG. 2. The electrical coupling of the wire bonds 50 is optionally enabled by a mechanical coupling of each of a plurality of wire bond ends 52 and the package body 4 of FIG. 2. The movable mirror 12 is coupled with the second opposite planar side 11B of the MEMS die 8. The first planar side 11A and the second opposite planar side 11B are substantially planar and parallel. The mirror 12 is controlled by electrical control and power signals sent via the pins 16, the wire bonds 50 and into the MEMS die 8 at the contact pads 48.

Figure 5B:
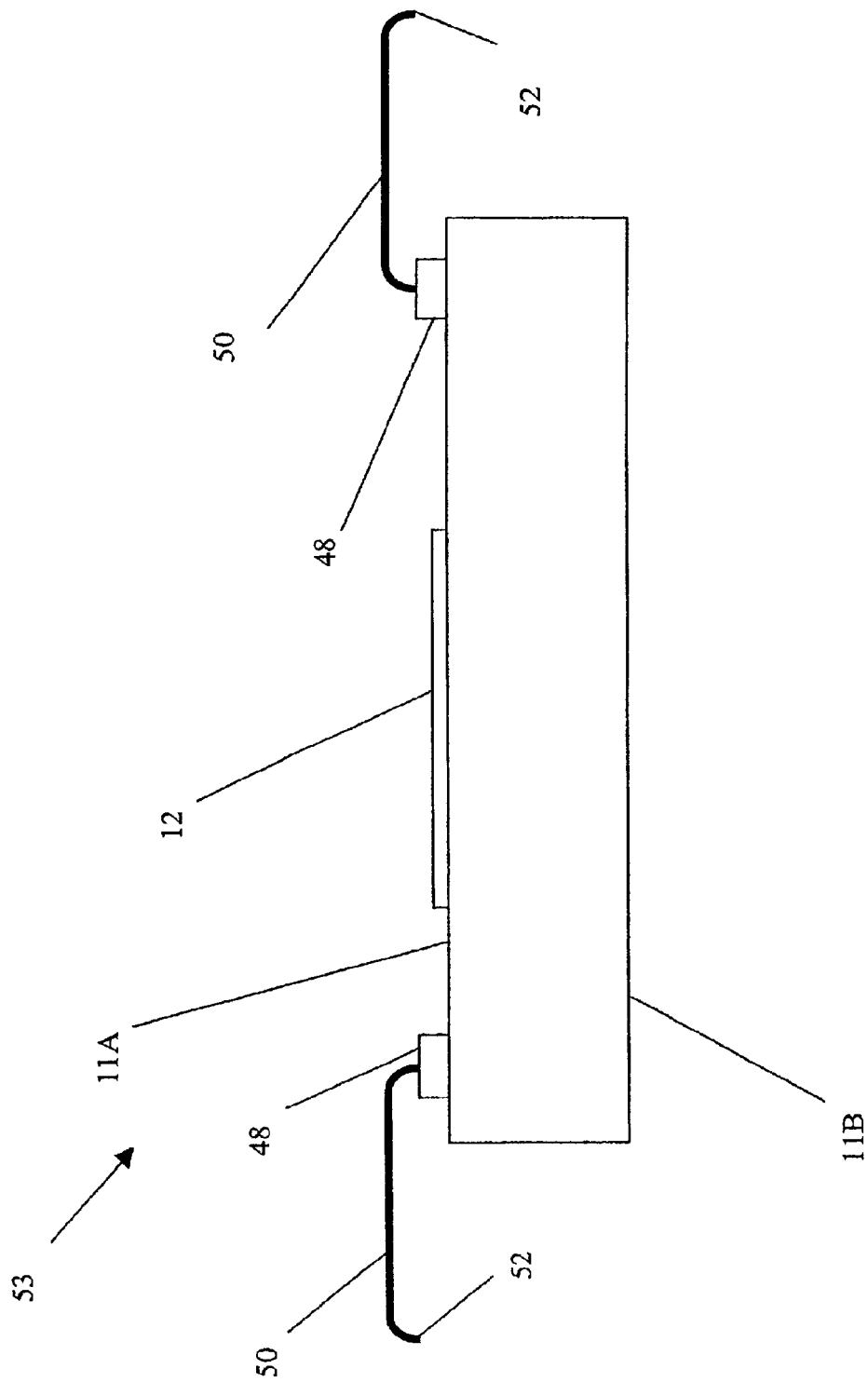
FIG. 5B is a side view of an alternate MEMS semiconductor die.

Referring now generally to the Figures and particularly to FIG. 5B, FIG. 5B is a cross-sectional view of an alternate MEMS semiconductor die 53 2. The first planar side 11A of the alternate MEMS die 53 has a plurality of electrical contact pads 48. Each of a plurality of wire bonds 50 are electrically coupled with at least one of the contact pads 48 and with at least one of the pins 16. The electrical coupling of the wire bonds 50 is optionally enabled by a mechanical coupling of each of a plurality of wire bond ends 52 and the package body 4 of FIG. 2. The movable mirror 12 is coupled with the first planar side 11A of the alternate MEMS die 53. The first planar side 11A and the second opposite planar side 11B are substantially planar and parallel. The mirror 12 is controlled by electrical control and power signals sent via the pins 16, the wire bonds 50 and into the alternate MEMS die 53 at the contact pads 48.

Figure 6:
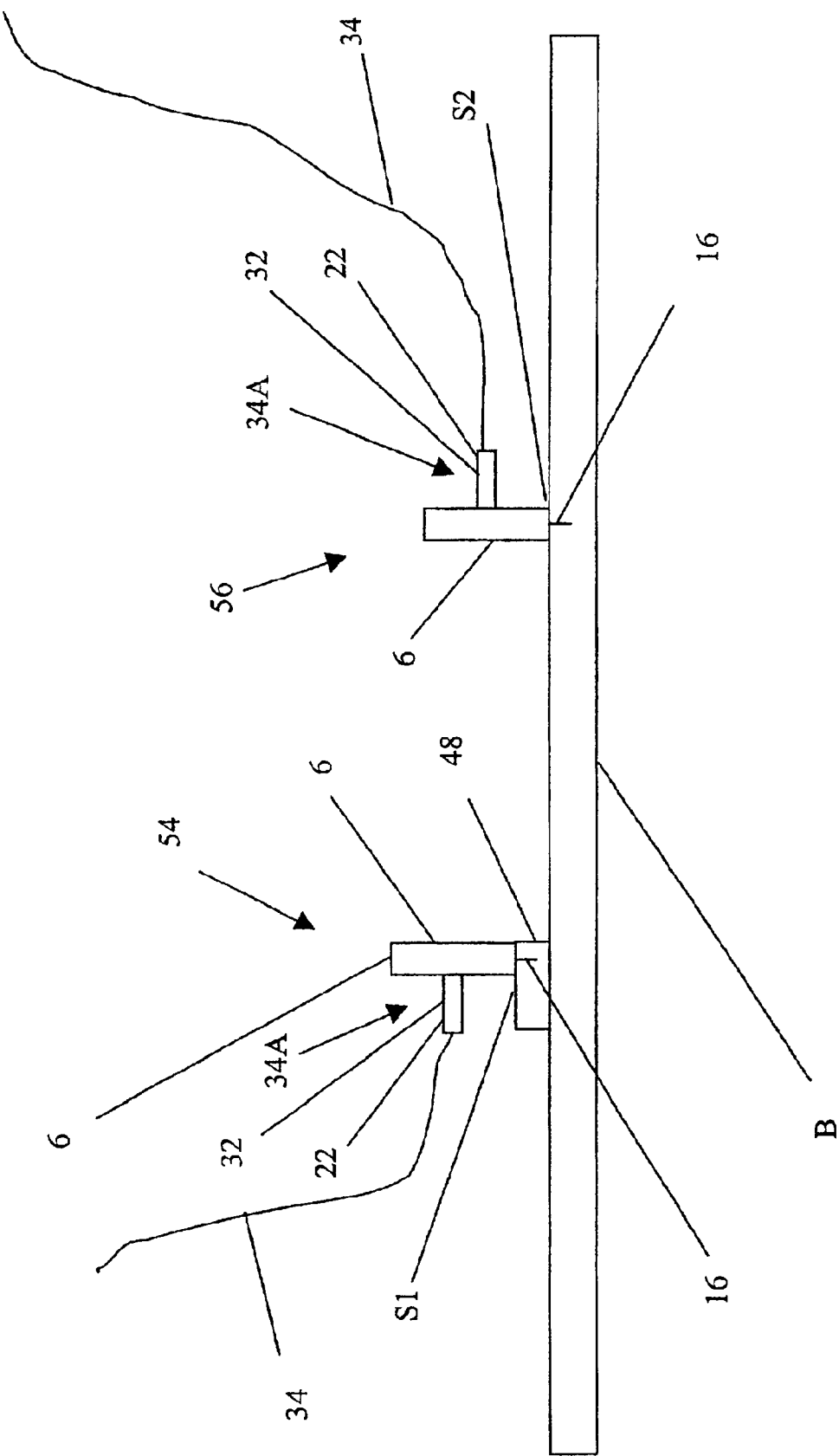
FIG. 6 is a side view of two variations of the invented package of FIG. 2 coupled with the PC board of FIG. 2.

Referring now generally to the Figures and particularly to FIG. 6, FIG. 6 is a side view two of variations 54 & 56 of the invented package 2 of FIG. 2 coupled with the PC board B of FIG. 1. Two individual invented packages 54 & 56 are coupled with the PC board B. A first individual invented package 54 is mounted onto a device socket 48. The device socket 48 accepts the pins 16 through a mounting surface S1 and is electrically and mechanically coupled with both the first individual package 54 and the PC board B. The second invented package 56 is directly mounted onto the PC board B at a planar mounting surface S2 and is thereby electrically and mechanically coupled with the PC board B. The photonic inlets 22 and the collimators 32 of the first individual invented package 54 and the second individual invented package 56, as well as a length 34A of each optical fiber 34, are approximately parallel to the mounting surface S1 and S2.

Figure 7:
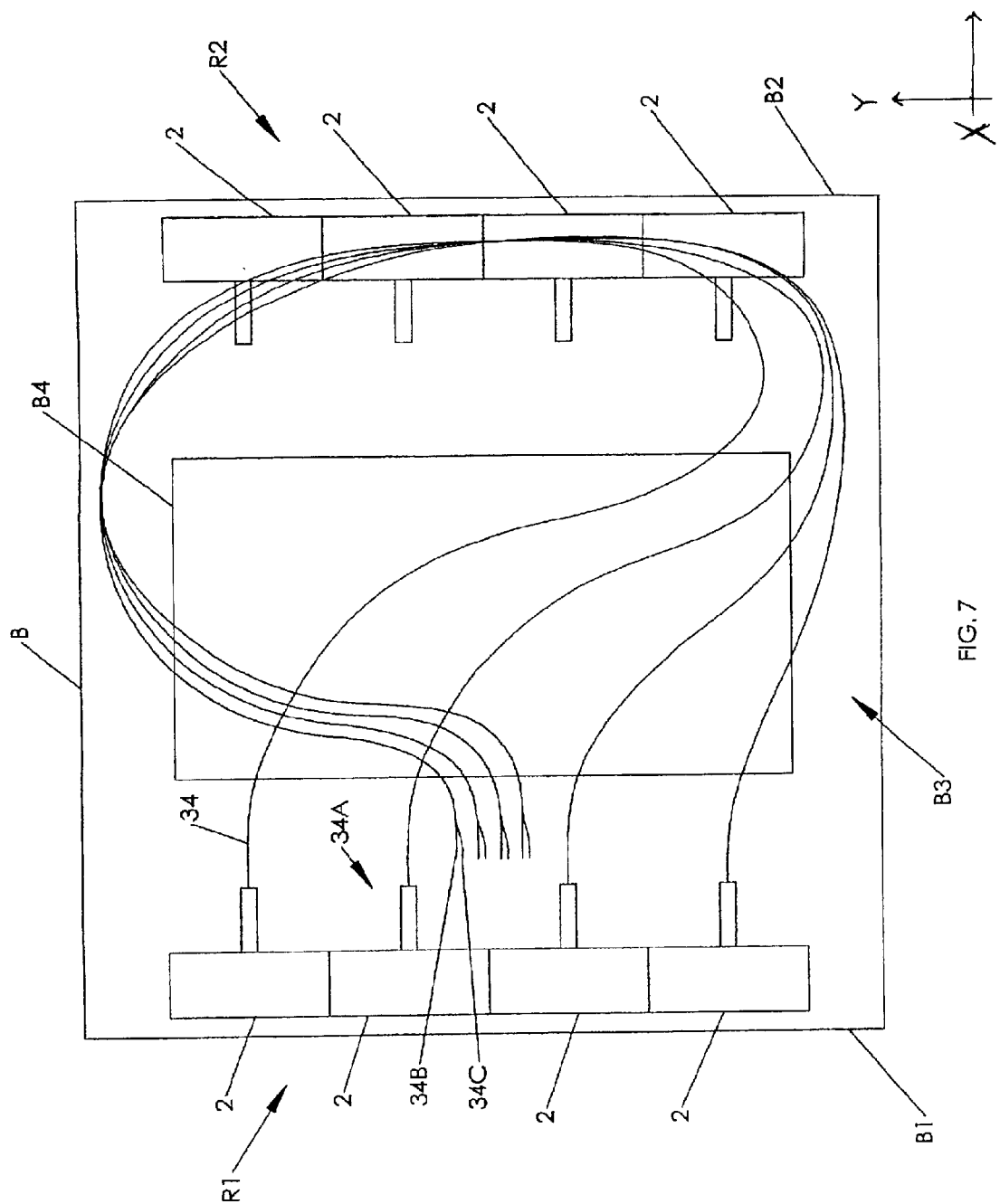
FIG. 7 is a top view of a plurality of the invented package of FIG. 1 coupled with the PC Board of FIG. 1.

Referring now generally to the Figures and particularly to FIG. 7, FIG. 7 is a top view of a plurality of the invented package 2 of FIG. 2 coupled with the PC Board of FIG. 1. Eight individual invented packages 2 are mounted on the PC board B and aligned in two separate rows R1 & R2 of four invented packages 2 each. The small footprint requirements of the invented package 2, i.e. the area of the module taken up by each invented package 2 in the X and Y dimensions, are depicted in FIG. 7.

The Rows R1 & R2 are positioned at opposite planar sides B1 & B2 of the PC board B in order to provide an optimized or maximized area B3 for positioning the optical fibers 34, while maintaining non-destructive bend radii of the optical fibers 34, as the optical fibers 34 approach the invented packages 2 from an outside area. The plurality of optical fibers 34 includes input fibers 34B and output fibers 34C. The area B3 allows a system designer or integrator to place the optical fibers 34 in positions that tend to have wider curves rather than tighter, and potentially damaging or performance degrading, curves. The area B4 is available for mounting electronic circuitry onto the PC board B.

Figure 8A:
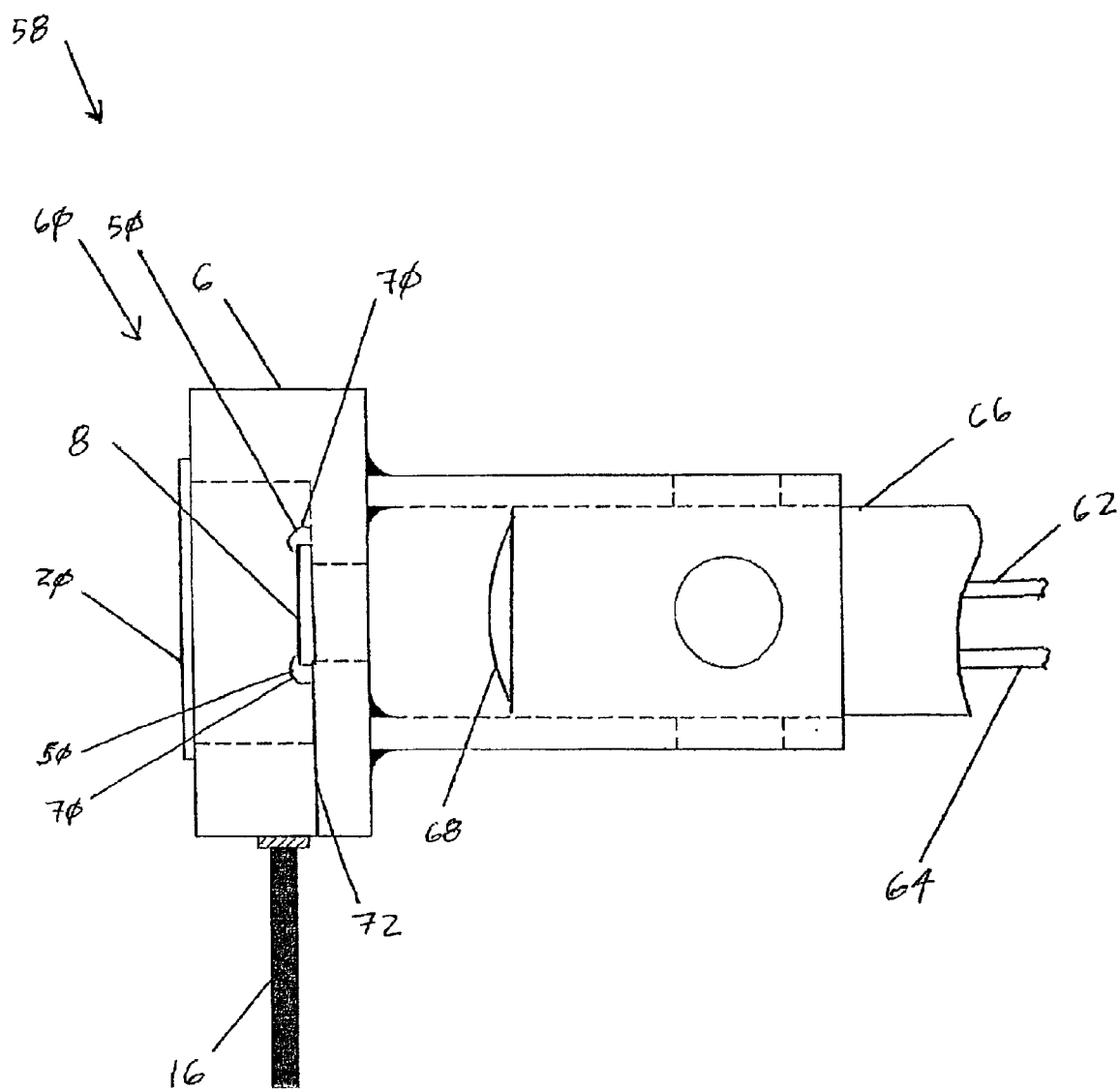
FIG. 8A is a cross-sectional view of an invented VOA package coupled with the photonic MEMS die of FIG. 1 and two optical fibers.

Referring now generally to the Figures and particularly to FIG. 8A, FIG. 8A is a cross-sectional view of a VOA 58 having an invented VOA package 60 with the MEMS 8 die and two optical fibers 62 & 64. The MEMS die 8 is enclosed with in the package body 6 and the lid 20. The two optical fibers 62 & 64 are coupled with the photonic inlet 22 via a dual collimator 66. A lens 68 of the dual collimator 66 focuses light emitted from one or both of the optical fibers 62 & 64 as the light travels from the optical fiber 62 & 64 and to the MEMS die 8. The lid 20 of the invented VOA package 60 seats into the package body 6 and in combination with the package body 6 encloses the MEMS die 8. The lid 20 may be attached to the bonding using suitable standard lid attaching equipment, e.g., lid tacking and lid sealing resistance welding equipment, known in the art. The MEMS die 8 is attached to the package body 6 using suitable standard die attach equipment and techniques known in the art. The die 8 may be attached to the package body 6 by means of suitable standard die attach equipment and using ABLESTIK adhesive part number 789-3, or another suitable adhesive material or technique known in the art. The MEMS die 8 is wire bonded via the wire bonds 50 to wire bond pads 70 located in the package body 6. The wire bonding is accomplished with standard wire bonding equipment and applying a suitable wire bonding technique known in the art. The wire bond pads 70 are each electrically connected with a trace 72. The traces 72 are additionally electrically connected with the leads 16. Power and control signals are conducted to the MEMS 8 via the leads 16. These power and control signals enable and direct the movable mirror 12 of the MEMS die 8 to redirect a light beam emitted from one of the optical fibers 62 & 64 to another of the optical fibers 62 & 64. An optical signal delivered to the mirror is thereby controllably attenuated by the process of controlling the position of the movable mirror 12.

The invented VOA package 60 is designed and sized in conformance with one or more standard semiconductor industry materials, sizing and design standards such that the invented VOA package 60 may be formed, fabricated assembled, wire bonded, packaged, tested and attached to the PC board by and of certain semiconductor industry standard materials, equipment and methods. Various preferred embodiments of the package may comprise suitable plastic, metallo-ceramic, or metal-glass, or other suitable materials, known in the art.

The die 8 is attached to the package body 6 by means of standard die attach equipment known in the art. The wire bonds 50 are formed using standard wire bond equipment. The invented VOA package 60 is formed and assembled using standard package forming and package assembly equipment known in the art. The VOA 58 and the invented VOA package 60 are tested using standard electrical, thermal, mechanical and/or other suitable standard test equipment known in the art. Moreover, the VOA 58 and the invented VOA package 60 are marked using suitable standard test equipment known in the art.

Figure 8B:
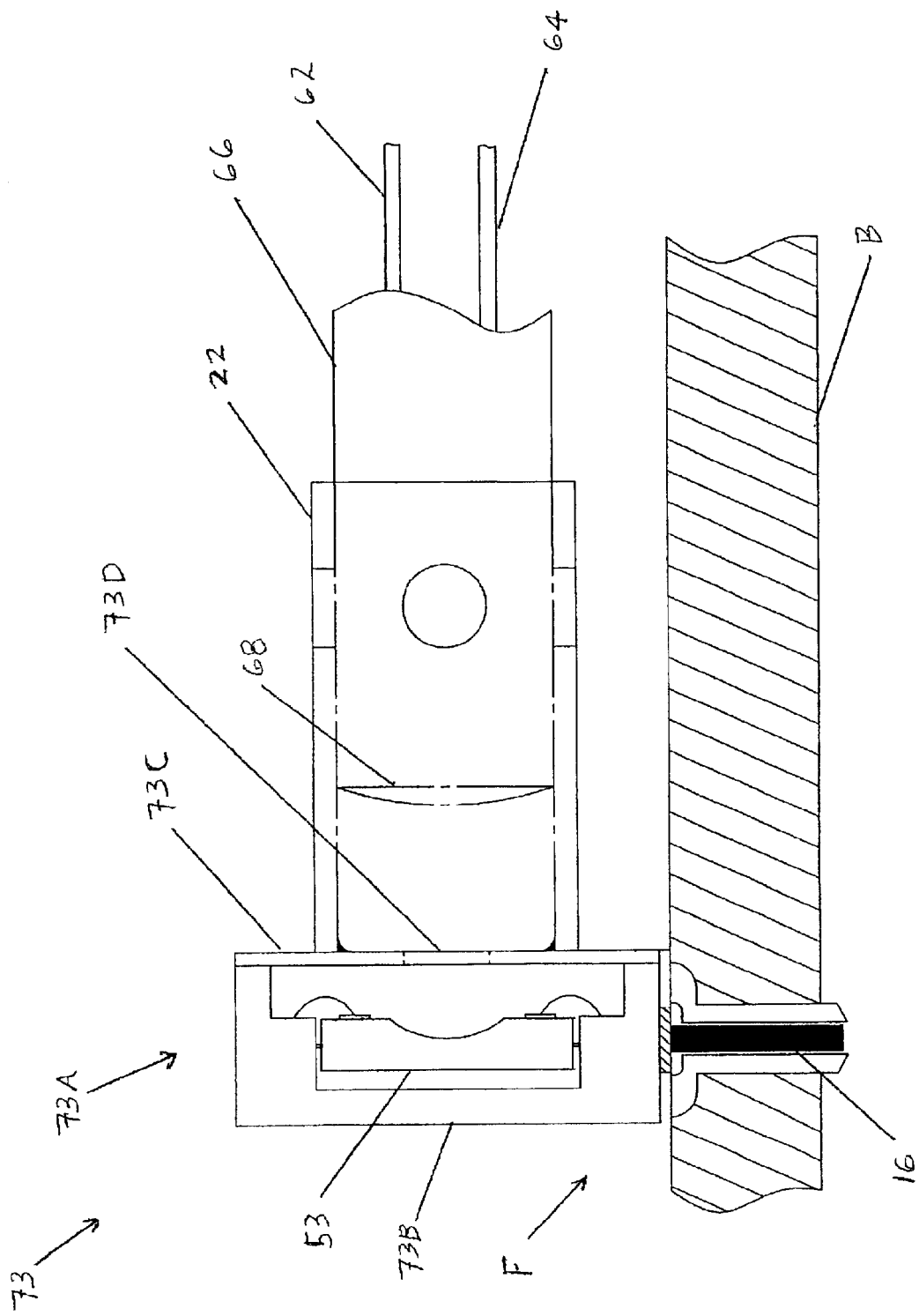
FIG. 8B is a cross-sectional view of an alternate VOA package coupled with the alternate photonic MEMS die of FIG. 5B and two optical fibers.

Referring now generally to the Figures and particularly to FIG. 8B, FIG. 8B is a cross-sectional view of an alternate VOA 73 having an alternate VOA package 73A with the alternate MEMS die 53 of FIG. 5B, and two optical fibers 62 & 64. The two optical fibers 62 & 64 are coupled with the photonic inlet 22 via the dual collimator 66. The photonic inlet 22 is coupled with a lid 73C. A through hole 73D extending through the lid 73C provides a pathway for light between the alternate MEMS die 53 and the optical fibers 62 & 64. The lens 68 of the dual collimator 66 focuses light emitted from one or both of the optical fibers 62 & 64 as the light travels from the optical fibers 62 & 64 and to the alternate MEMS die 53. The lid 73C of the alternate VOA package 73A seats into the alternate VOA package body 73B. The lid 73C in combination with the alternate VOA package body 73B encloses the alternate MEMS die 53. The footprint F is the area of the PC Board B that is required to be available for mounting the alternate VOA 73 to the PC Board B. The plurality of pins 16 are oriented to not increase the required dimensions of the footprint F.

Figure 9A:
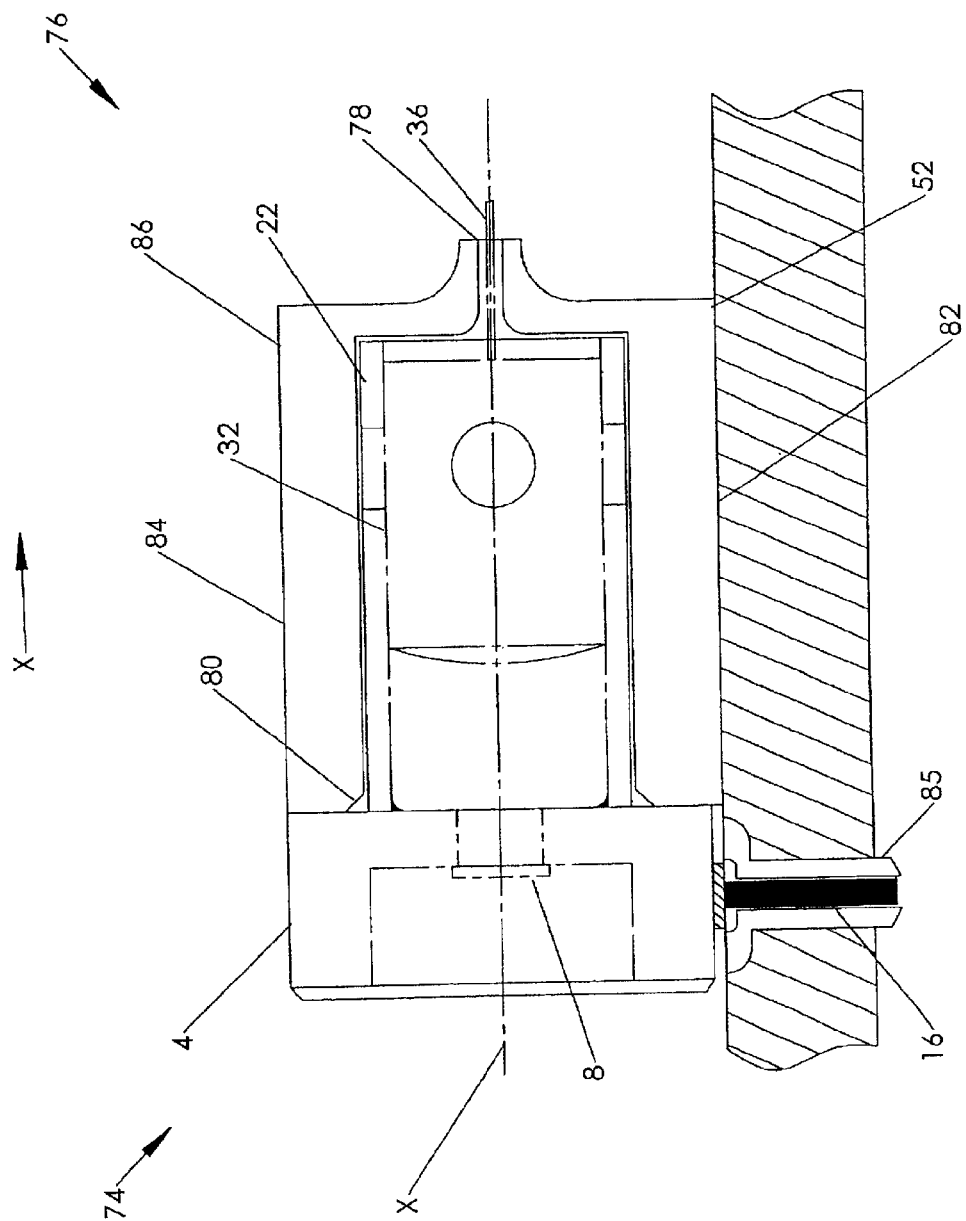
FIG. 9A is a side view third preferred embodiment of the present invention having a boot with a flat base and an upper wall.
Figure 9B:
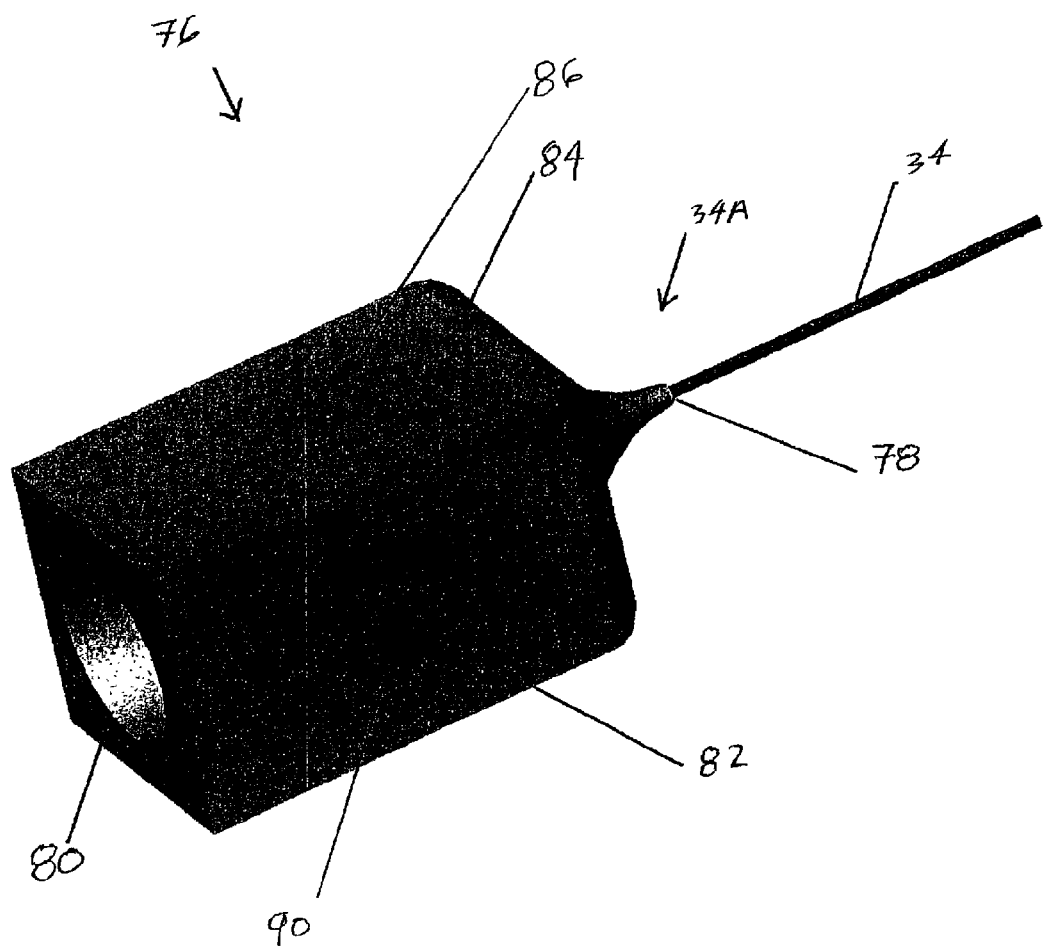
FIG. 9B is an isometric view of the boot of FIG. 9A.

Referring now generally to the Figures and particularly to FIG. 9A, FIG. 9A is a side view of a third preferred embodiment 74 of the present invention that includes the invented package 2 and additionally comprises a boot 76. The boot 76 has a boot opening 78, a boot hole 80, a flat base 82 and an upper wall 84. The flat base 82 is substantially planar and is positioned against PC board B, or alternatively a suitable module known in the art, when the third preferred embodiment is coupled with the PC board B or an alternate, suitable module. Each pin 16 is inserted into a socket 85 to mechanically and electrically couple the third preferred embodiment 74 to the PC board B. The positioning of the flat surface of base 82 against the PC board B improves the mechanical stability of the third preferred embodiment 74 an at least the X and Y directions. The boot 76 at least partially encloses an external photonic element 36 and a photonic inlet 22. The external photonic element 36 is coupled with, and at least partially inserted into, the photonic inlet 22. The photonic inlet 22 is coupled with the package body 4 and oriented as described in the previous discussion of the invented package 2. The boot opening 78 enables a partial or total insertion of the photonic component 36 into the boot 76. Light may travel between external photonic element 36 and the semiconductor die 8 via the boot hole 80. Referring now generally to the Figures and particularly to FIG. 9B, FIG. 9B is an isometric view of the boot 76 of FIG. 9A.

Figure 9C:
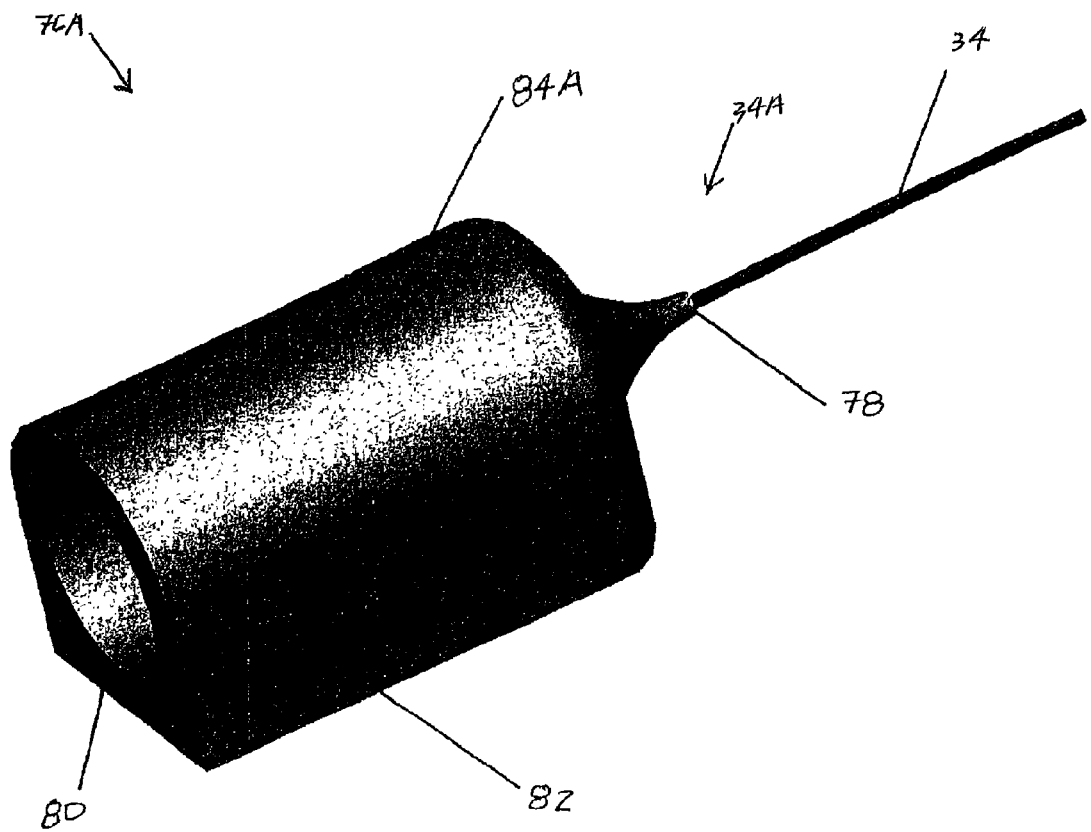
FIG. 9C is an isometric view of an alternate boot shape having a partially cylindrical upper wall.

Referring now generally to the Figures and particularly to FIG. 9C, FIG. 9C is an isometric view of an alternate boot 76A having the boot opening 78, the boot hole 80, the flat base 82 and a partially cylindrical upper wall 84A. The partially cylindrical upper wall 84A and the flat base 82 enclose the photonic inlet 22. The curved surface of the partially cylindrical upper wall 84A is preferred in certain configurations of equipment that include the present invention.

Figure 10:
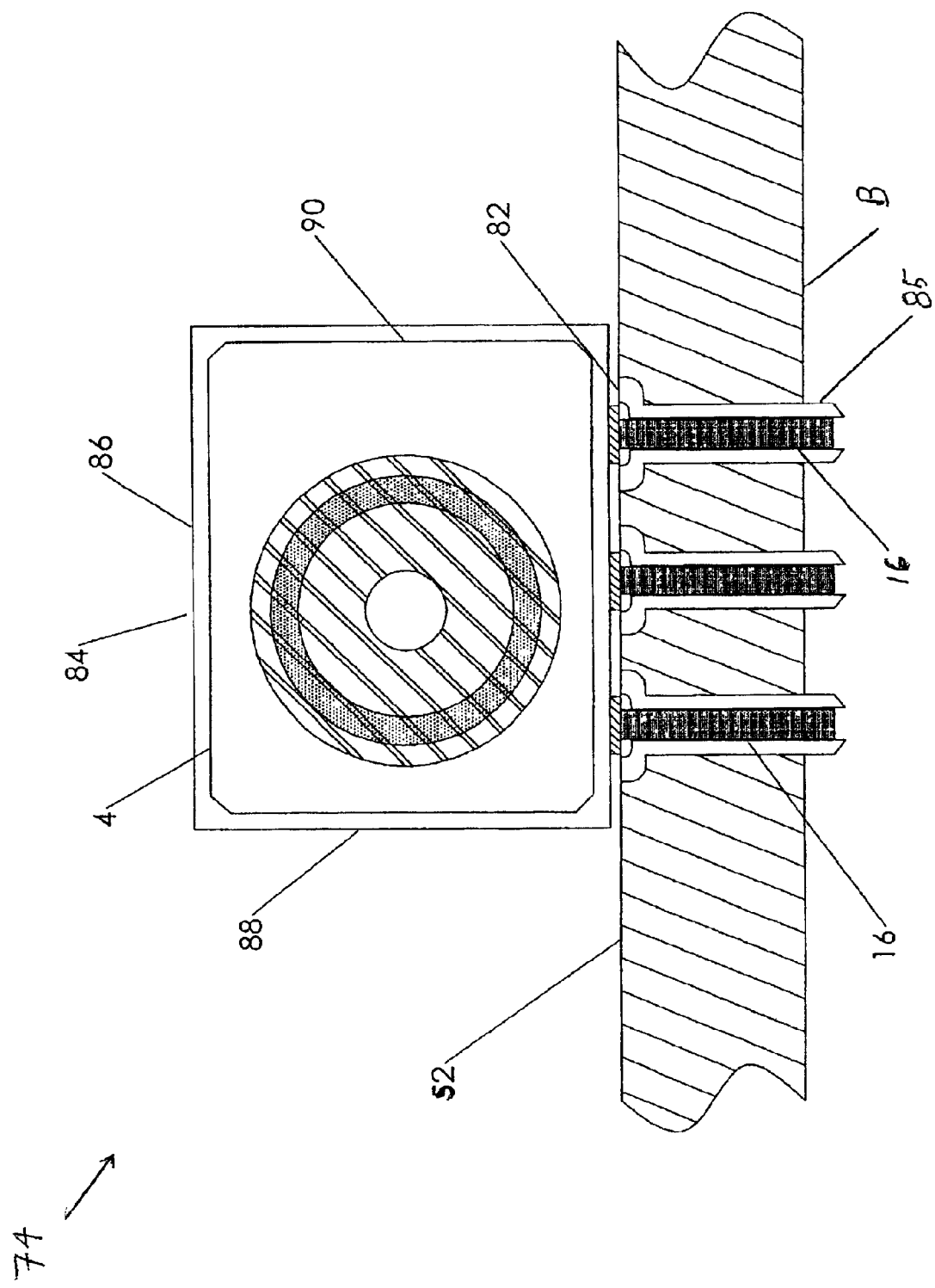
FIG. 10 is a view of the photonic element side of the third preferred embodiment of FIG. 9A.

Referring now generally to the Figures and particularly to FIG. 10, FIG. 10 is a view of the photonic element side of the third preferred embodiment 76 of the present invention 2. The upper wall 84 comprises a substantially planar top side 86 and two substantially planar and parallel side surfaces 88 & 90. The side surfaces 88 & 90 are substantially perpendicular to the base 82 and the top side 86. The substantially flat and planar surfaces of the base 82, the top surface 84, and the two side surfaces 88 & 90 are easier and less expensive to mark and add signage to than prior art boots having curved and non-flat surfaces. Automated mounting and handling systems more efficiently grasp and position the boot 76 due to the flatness of the base 82, the top surface 84, and the two side surfaces 88 & 90, in contrast to prior art boots or boots that are curved or non-planar. The flatness and orientation of the base 82, the top surface 84, and both side surfaces 88 & 90 enable more efficient packing and shipping of the boot 76 of the third preferred embodiment over the prior art.

Certain alternate preferred embodiments of the method of the present invention can optionally enable the assembly of the invented VOA package 60 that may be assembled with suitable clean room compatible testing and fabrication equipment known in the art. The invented VOA package 60 may be mounted onto a PC board, or a module, a system, a subsystem, or a socket and by using suitable standard device or component mounting equipment and techniques known in the art.

The present invention has been described in conjunction with the preferred embodiments. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense. As noted above, the present invention is applicable to the use, operation, structure and fabrication of a number of different photonic component assemblies. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications, devices and methods.

I claim:

1. A photonic component package, the package such that:
the package couples at least two photonic elements;
the package is mounted onto a module; and
the package comprises:
a package body with a through hole;
an interior;
at least two pins, the at least two pins for insertion into the module, wherein
the at least two pins each comprise a substantially straight section, and the at least two pins extend from the package body without increasing the footprint requirements of the package for mounting the package on the module;
a photonic inlet on one side of the through hole, the photonic inlet oriented parallel to a mounting surface of the module and aligned with the through hole, the photonic inlet oriented parallel to a mounting surface of the module and aligned with the through hole, and the photonic inlet for attaching to at least one photonic element; and
a lid, the lid attached to the package body on the side of the through hole opposite to that having the photonic inlet; and
the interior for housing a semiconductor die, the semiconductor such that:
the semiconductor die has two sides:
a planar side with at least two electrical pads for electrical connection to the at least two pins; and
a die photonic element side having a die photonic element, the die photonic element side opposite to the planar side; and
the semiconductor die is attached to the package in such a way that:
the photonic element side of the die is positioned approximately orthogonal to the photonic inlet, on the opposite side of the through hole from the photonic inlet, and facing the through hole;
the die photonic element is optically coupled with the at least one photonic element attached to the photonic inlet on the side of the through hole opposite to that to which the semiconductor die attached; and
electrical connection to the electrical contact pads in on the planar side of the die, this planar side of the die facing away from the from the through hole and the photonic inlet.

2. The photonic component package of claim 1, wherein the package body further comprises a pinout side, wherein the straight sections of the at least two pins are positioned substantially orthogonally from the pinout side.

3. The photonic component package of claim 1, wherein the photonic element is a MEMS-based movable micromirror with its reflective surface on the side opposite to that containing electrical contact pads for wire-bonding.

4. The photonic component package of claim 1, wherein the body comprises ceramic.

5. The photonic component package of claim 1, wherein the body comprises metal.

6. The photonic component package of claim 1, wherein the at least two pins are oriented to fit into a socket.

7. The photonic component package of claim 1, wherein the photonic component package is a low cost package.

8. The photonic component package of claim 1, wherein the photonic element comprises a photodiode with its photosensitive area on the side opposite to that containing electrical contact pads for wire-bonding.

9. The photonic component package of claim 1, wherein the photonic element is a VCSEL with its emitting surface on the side opposite to that containing electrical contact pads for wire bonding.

10. The photonic component package of claim 9, wherein the photonic component package is further coupled with a receiving photonic element, the receiving photonic element coupled with the photonic inlet and for receiving light from the semiconductor die and via the through hole.

11. The photonic component package of claim 10, wherein the receiving photonic element is selected from the group consisting of a wave guide, a planar wave guide, a photonic crystal wave guide, a diffraction wave guide grating, an optical fiber, a collimator, a dual fiber collimator, a multi-fiber collimator, a lens, a diffractive lens, an optical lens, a spherical lens, an aspherical lens, a ball lens, a GRIN lens, a C-lens, a lens system, a mirror, a MEMS-based movable micro-mirror, a flat mirror, a shaped mirror, a diffractive mirror, a grating plate or plates, a modulator, a photodiode, and a prism.

12. The photonic component package of claim 1, wherein the body comprises ceramic.

13. The photonic component package of claim 1, wherein the body comprises metal.

14. The photonic component package of claim 3, wherein the mirror is movable in response to electrical signals applied to the MEMS device via at least one of the at least two pins, whereby the angle of reflection of the light from the MEMS is affected.

15. The photonic component package of claim 1, wherein the photonic component package further comprises at least three pins coupled to and extending from the pinout side and the at least three pins are electrically coupled with the semiconductor die.

16. The photonic component package of claim 1, wherein the package further comprises a boot, the boot for at least partially enclosing the photonic inlet, the boot comprising:
- a base, an upper wall, a boot opening, and a boot hole, wherein the boot opening enables at least partial insertion of the photonic element into the boot, and light may pass between the photonic element and the semiconductor die and through the boot hole;
- the base is substantially planar and is positioned to make mechanical contact with a surface of a module when the photonic component package is mechanically coupled with the module; and
- the upper wall is coupled with the base, and the upper wall and base in combination house the photonic inlet.

17. The photonic component package of claim 16, wherein the upper wall of the boot further comprises three substantially planar surfaces, wherein a first substantially planar surface is substantially parallel with the base, and a second and a third substantially planar surfaces are both substantially perpendicular to the base.

18. A VOA package, the VOA package for attachment to a mounting surface of a module, and the VOA package for enclosing a semiconductor die, the semiconductor die comprising or coupled with a movable mirror, and the semiconductor die having two planar sides, at least two electrical contact pads on the side of the die opposite to that having the movable mirror, and the semiconductor die further comprises or is coupled with the movable mirror, and the VOA package coupled with a collimator, the collimator for positioning at least two optical fibers, the VOA package comprising:
- a package body, a through hole, a lid, a photonic inlet, and at least two pins;
- the package body having a pinout side, a photonic inlet side and a cavity;
- the photonic inlet attached to the photonic inlet side of the package, and the photonic inlet for attaching the collimator and positioning the optical fibers to be parallel to the mounting surface of the module;
- the through hole extending through the VOA package and to the cavity, and the through hole for enabling light to pass between the movable mirror and the at least two optical fibers;
- each of the at least two pins coupled with the pinout side and electrically coupled with the semiconductor die on the side of the die opposite to that having the movable mirror, and the at least two pins extending from the pinout side;
- the lid coupled with the body and enclosing the cavity; and
- whereby the semiconductor die is attached to the body and within the cavity, and the mirror of the semiconductor die is positioned to variably optically attenuate an optical signal emitted from at least one of the at least two optical fibers through a collimator lens by controllably redirecting the optical signal reflected from the mirror back through the through hole and going back through the collimator lens to the other optical fiber.

19. The photonic component package of claim 18, wherein the photonic component package further comprises at least three pins coupled to and extending from the pinout side and the at least three pins electrically coupled with the semiconductor die.

20. The VOA package of claim 18, wherein the body comprises ceramic.

21. The VOA package of claim 18, wherein the body comprises metal.

22. The VOA package of claim 18, wherein the semiconductor die is comprised within a MEMS device.

23. A method of packaging a photonic component, comprising:
- providing an external photonic element;
- providing a semiconductor die, the semiconductor die having a planar side, at least two electrical contact pads, and a die photonic element;
- providing a package, the package having a package body, at least two pins, a lid, a through hole, and a photonic inlet;
- the package body having a pinout side and a cavity;
- the at least two pins extending from the pinout side of the package body, and wherein the projections of the at least two pins onto the pinout side are fully contained within the footprint of the package body;
- the lid for attachment to the package body and for enclosing the cavity;
- the through hole for providing a pathway for light through the package and between the external photonic element and the die photonic element;
- the photonic inlet oriented parallel to a mounting surface of a module, and the photonic inlet for aligning and attaching the external photonic element;

attaching the semiconductor die to the package body and within the cavity, and in an orientation wherein the planar side of the semiconductor die is approximately orthogonal to the photonic inlet;

bonding of at least one wire to at least one pin and to one of the at least two electrical contact pads;

attaching the lid to the package body and enclosing the cavity;

aligning the external photonic element relative to the through hole and the die photonic element to optically couple the external photonic element and the die photonic element; and attaching the external photonic element to the photonic inlet in a optically coupled alignment, whereby the semiconductor die is positioned approximately orthogonal to the external photonic element, and the die photonic element and the external photonic element are optically coupled via the through hole.

24. The method of claim 23, wherein standard die attach equipment attaches the semiconductor die to the package body.

25. The method of claim 23, wherein the wire bonds are formed using standard wire bond equipment.

26. The method of claim 23, wherein the package is assembled with standard packaging equipment.

27. The method of claim 23, wherein the lid is attached to the body package with standard lid attachment equipment.

28. The method of claim 23, wherein the package is marked with standard semiconductor device marking equipment.

29. The method of claim 23, wherein the photonic component is tested using standard test equipment.

30. The method of claim 23, further comprising providing a module and mounting the device onto the module using standard mounting equipment.

31. The method of claim 23, wherein the package substantially complies with a suitable package standard known in the art.

* * * * *